A. GRIEVES.
MOWING MACHINE.
APPLICATION FILED DEC. 7, 1911. RENEWED SEPT. 4, 1913.
1,310,616.
Patented July 22, 1919.
2 SHEETS—SHEET 1.
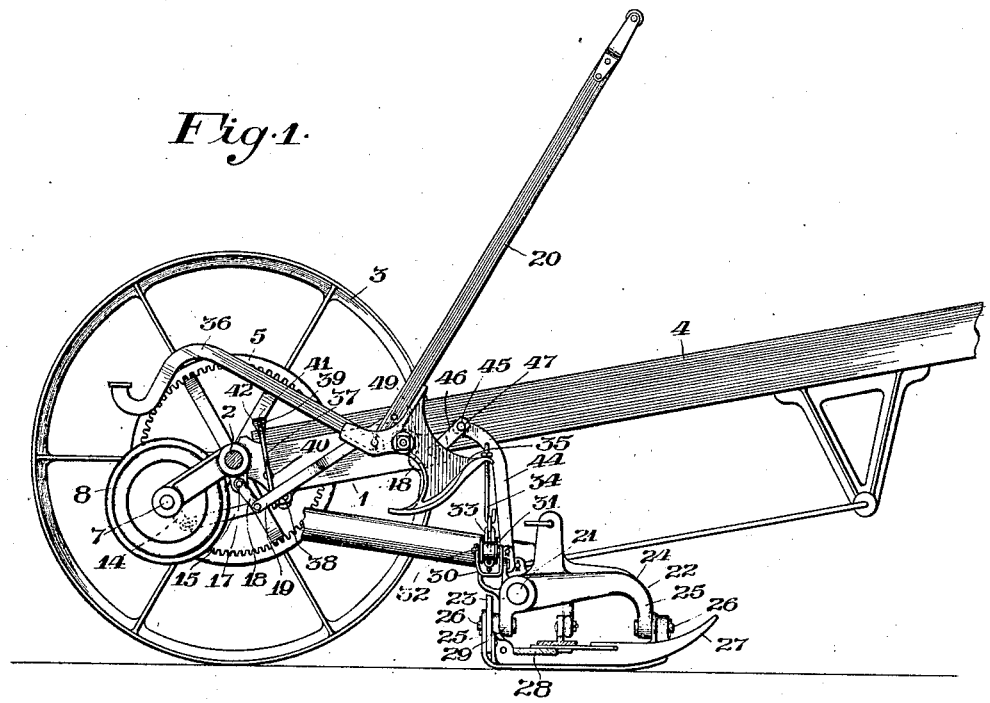
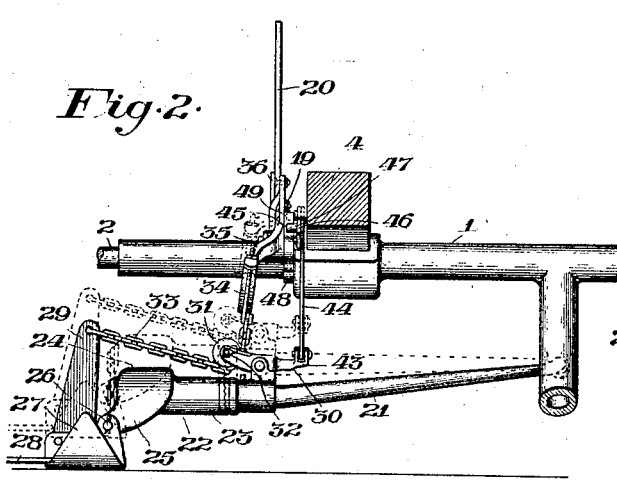
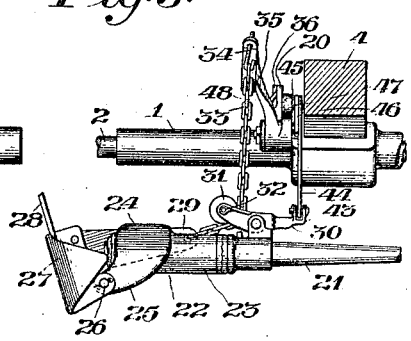
Witnesses:
F. W. Hoffmeister
C. C. Palmer
Inventor·
Albert Grieves·
By E. W. Burgess
Attorney A. GRIEVES.
MOWING MACHINE.
APPLICATION FILED DEC. 7, 1911. RENEWED SEPT. 4, 1913.
1,310,616.
Patented July 22, 1919.
2 SHEETS—SHEET 2.
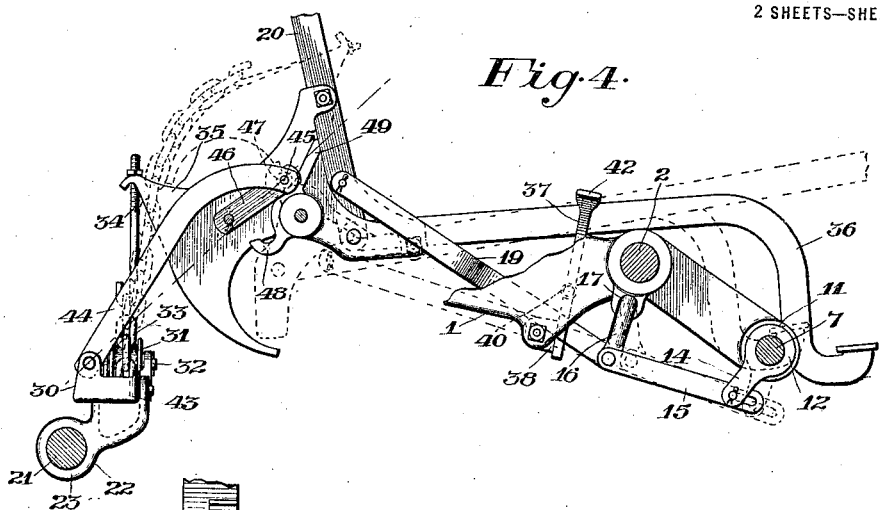
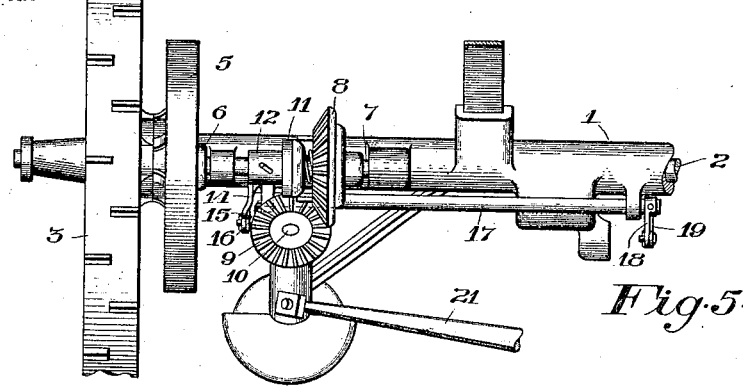
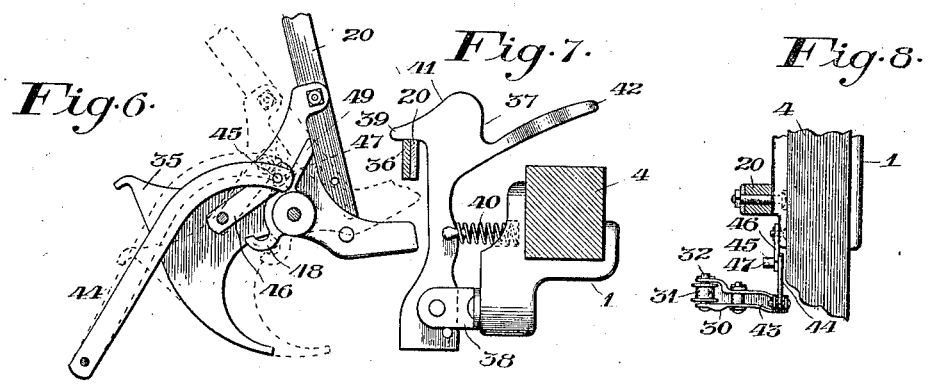
Witnesses:
F. W. Hoffmeister
C. C. Palmer
Inventor.
Albert Grieves
By O. W. Burgett
Attorney

UNITED STATES PATENT OFFICE.

ALBERT GRIEVES, OF SPRINGFIELD, OHIO, ASSIGNOR, BY MESNE ASSIGNMENTS, TO INTERNATIONAL HARVESTER COMPANY, A CORPORATION OF NEW JERSEY.

MOWING-MACHINE.

1,310,616.     Specification of Letters Patent.     Patented July 22, 1919.

Application filed December 7, 1911, Serial No. 664,349. Renewed September 4, 1913. Serial No. 788,158.

*To all whom it may concern:*

Be it known that I, ALBERT GRIEVES, a citizen of the United States, residing at Springfield, in the county of Clark and State of Ohio, have invented certain new and useful Improvements in Mowing-Machines, of which the following is a specification.

My invention relates to mowing machines wherein means are provided whereby the finger bar may be raised to substantially a vertical position by means controlled by the operator, said means being connected with clutch shipping means forming part of the power transmitting mechanism and operatively connected with the cutting apparatus in a manner to automatically disengage the clutch mechanism when the finger bar has reached a predetermined angle of elevation, and to permit the reëngagement of the clutch mechanism when said bar has been lowered to a predetermined angle relative to the wheeled frame of the machine; the object of my invention being to provide an improved form of safety device operative in a manner to prevent the engagement of the clutch mechanism until the finger bar has been lowered to a predetermined angle with the wheeled frame of the machine and the coupling frame to an operative position. I attain this object by means of mechanism, one embodiment of which is illustrated in the accompanying drawings, in which—

Figure 1 represents a side elevation of part of a mowing machine having my invention forming a part thereof;

Fig. 2 is a front elevation of part of the mechanism shown in Fig. 1, designed to illustrate the operation of the raising and lowering mechanism connected with the cutting apparatus;

Fig. 3 is a detached detail of Fig. 1 similar to that shown in Fig. 2, and designed to show the position of the associated parts of the mechanism when the finger bar has been raised to substantially a vertical position;

Fig. 4 is a sectional side elevation of part of the machine, showing the connection between the manually operative lifting lever and the clutch shipping means, and the operation of the safety clutch controlling mechanism;

Fig. 5 is a rear elevation of Fig. 1, designed to show the construction of part of the clutch shipping mechanism;

Fig. 6 is a detached detail of the lifting lever mechanism, designed to illustrate the manner of operatively connecting the safety means therewith;

Fig. 7 represents a detail of a latch mechanism associated with the manually controlled hand and foot levers forming part of the finger bar raising and lowering mechanism; and Fig. 8 is a sectional top plan view of part of the safety locking mechanism, showing the manner of connecting the same with the raising and lowering mechanism.

The same reference numerals designate like parts throughout the several views.

1 represents the wheeled frame of the machine, having a driving axle 2 journaled therein; 3 one of the carrying wheels mounted upon said axle; 4 a draft tongue secured to the wheeled frame; 5 a gear wheel secured to said axle and meshing with a pinion 6 secured to the stubbleward end of a countershaft 7, having a gear wheel 8 loosely mounted upon the opposite end thereof and meshing with a pinion 9 secured to the rear end of crank shaft 10, that may be operatively connected with the cutting apparatus in any well-known way. 11 represents a clutch mechanism mounted upon the shaft 7 and adapted to cause the gear wheel 8 to rotate with the shaft or remain idle, depending upon the position of adjustment of the clutch shipping mechanism. The clutch shipping mechanism includes a sleeve member 12 suitably mounted upon the shaft 7 and provided with an arm 14 which is connected, by means of a link 15, with a crank arm 16 formed upon the stubbleward end of a transverse rock shaft 17, the link having a slotted opening that receives a connecting pin in a manner permitting a limited rocking movement of the shaft independent of the arm 14, the rock shaft being journaled upon the wheeled frame of the machine and operative, when rocked in one direction, to disengage the clutch mechanism, and when rocked in an opposite direction to permit said mechanism to engage in any of the well-known ways. 18 represents an arm secured to the opposite end of said rock shaft, and 19 a link connecting said arm with a lifting lever 20 pivotally mounted upon the wheeled frame. 21 represents a coupling bar having its stubbleward end pivotally connected with the wheeled frame in a manner permitting the opposite end thereof to rise and fall relative to the wheeled frame. 22 represents a coupling yoke provided with a sleeve portion 23 that receives the coupling bar in a manner permitting the yoke to rock thereon, a head portion 24 having depending arms 25 at opposite ends thereof that are provided with openings adapted to receive hinge pins 26 arranged in the direction of the line of draft of the machine, and whereby an inner shoe 27 is connected therewith. 28 represents a finger bar having the inner end thereof secured to said shoe, and 29 an upstanding arm secured to the rear end of the shoe. 30 represents a transversely disposed lever pivotally connected intermediate its ends with a fixed part of the coupling frame and having a sheave 31 journaled upon a cross pin 32 at one end thereof, and 33 is a chain having one end adjustably connected, by means of an eye bolt 34, with an arm 35 forming part of the lifting lever 20, the chain engaging with the sheave and having the opposite end thereof connected with the end of arm 29 and operative in a manner to raise the coupling frame and swing the finger bar about the axis thereof from a horizontal to substantially a vertical position when the lifting lever is swung rearward to the limit of its range of movement. 36 represents a foot lever having its forward end pivotally connected with a rearwardly extending arm forming part of the hand lever, and 37 represents a latch member having its lower end pivotally connected with a bracket member 38 secured to the wheeled frame, the upper end thereof being provided with a hook portion 39 adapted to engage with the hand and foot levers in a manner to retain the coupling bar and finger bar in an elevated position, the latch being normally pressed in a direction to engage with the levers by means of a compression spring 40 operative between the wheeled frame and the latch. The hooked end of the latch is provided with an inclined surface 41 with which the levers engage in a manner to swing the latch laterally and permit the levers to pass below the hook portion, and 42 represents a laterally extendnig wing portion whereby the operator may release the latch by applying pressure to the wing.

The parts so far enumerated and described are common in the class of machines indicated, the novelty of my invention being the means provided whereby the clutch mechanism, when disengaged by means of the connection thereof with the lifting lever, will not be permitted to reëngage until the finger bar and coupling bar have passed through a predetermined part of their downward movement toward an operative position, the means employed being as follows: The lever 30 is provided with an arm 43 that extends stubbleward from the axis thereof, and 44 represents a toggle link having its lower end pivotally connected with said arm and the opposite end thereof curved rearwardly and, by means of a pin 45, pivotally connected with the upper end of a swinging toggle arm 46, the lower end of said arm being pivotally connected with a fixed part of the wheeled frame. The pin 45 is provided with a laterally projecting head portion 47 that is arranged within the path of a hook-shaped arm 48 integral with the lifting lever and adapted to engage with the head of the pin when the lever is moved rearward for the purpose of raising the finger bar to a vertical position in a manner to swing the upper end of the link 44 rearward and downward to a position having the axis of the pin below a line drawn through the axis of the pivotal connection of link 44 with arm 43 and the axis of the swinging arm 46, whereby the parts of the toggle mechanism are automatically locked against a return movement until the arm 46 is turned about its axis in a forward direction sufficient to throw the axis of the pin 45 above such line. When the lifting lever is in the position shown by dotted lines in Fig. 4 the coupling bar has reached the limit of its elevation, the finger bar has been thrown to substantially a vertical position and the clutch mechanism is disengaged. When it is desired to lower the coupling bar and allow the finger bar to swing to an operative position upon the ground, the hand lever is moved forward to a position shown in dotted lines in Fig. 6, permitting the finger bar to swing outward and downward as the chain 33 is drawn under the sheave 31, the coupling bar remaining in an elevated position by reason of the fixed connection therewith of the link 44 until a predetermined limit of forward movement of the hand lever has been reached, and in which position a laterally projecting rib 49, integral with the hand lever, will engage with the pin 45 in a manner to swing the arm 46 upward and forward about the axis thereof until the axis of the pin has reached a position permitting the coupling bar to fall to an operative position and simultaneously the engagement of the clutch mechanism.

While I have in this application specifically described one embodiment which my invention may assume, it is to be understood that this form of the same is used only for purposes of illustration and that the invention itself may be modified and embodied in other forms without departing from its spirit, it being my intention to include within the scope of the appended claims all such modifications and embodiments of the invention.

What I claim as my invention, and desire to secure by Letters Patent, is:

1. In a mowing machine, a main frame, a coupling frame adjustably mounted thereon, means for adjusting said coupling frame, and toggle mechanism for holding said coupling frame in its adjusted position.

2. In a mowing machine, a main frame, a coupling frame adjustably mounted thereon, means for adjusting said coupling frame, and automatically-acting self locking and unlocking toggle mechanism for holding said coupling frame in its adjusted position.

3. In a mowing machine, a main frame, a coupling frame adjustably mounted thereon, adjusting mechanism therefor including an operating lever on said main frame, and toggle mechanism operatively connected between said frames and controlled by said lever for maintaining said coupling frame in its adjusted position.

4. In a mowing machine, a main frame, a coupling frame adjustably mounted thereon, a lever carried on said main frame, and a toggle connection between said frames and controlled by said lever for automatically locking said coupling frame in a predetermined position.

5. In a mowing machine, a main frame, a coupling frame adjustably mounted thereon, a lever carried on said main frame, toggle mechanism operatively connected between said coupling frame and said main frame and means operated by said lever for automatically locking said toggle mechanism in its locked position.

6. In a mowing machine, a main frame, a coupling frame pivotally mounted thereon, an operating lever pivotally mounted on said main frame, a toggle intermediate said main frame and said coupling frame, a locking member carried on said operating lever for locking said toggle in its locked position, and means carried on said operating lever for breaking said toggle.

7. In a mowing machine, a main frame, a coupling frame pivotally mounted thereon, lever mechanism carried on said main frame for varying the elevation of said coupling frame, and means including a toggle connection intermediate said main frame and said coupling frame automatically operative upon movement of said lever to lock and unlock said coupling frame in predetermined positions of said lever mechanism.

8. In a mowing machine, a main frame, a finger bar, a coupling frame, an operating lever, flexible connections between said operating lever and said finger bar operable to raise said finger bar and coupling frame during the initial movement of said lever, and means including a toggle connection operatively connected to said operating lever for locking said coupling frame in elevated position during continued movement of said lever.

9. In a mowing machine, a main frame, a coupling frame adjustably mounted thereon, toggle mechanism for holding said coupling frame in adjusted position including a toggle member pivotally connected to said coupling frame, a coöperating toggle member pivotally connected thereto and to said main frame, and an operating lever carried on said main frame controlling said toggle mechanism.

10. In a mowing machine, a main frame, a coupling frame adjustably mounted thereon, toggle mechanism for holding said coupling frame in adjusted position including a toggle member pivoted to said coupling frame, a coöperating toggle member pivoted to said first mentioned toggle member and to said main frame, operating mechanism carried on said main frame for adjusting said coupling frame, and means movable with said mechanism for holding said toggle mechanism in locked position.

11. In a mowing machine, a main frame, a coupling frame adjustably mounted thereon, toggle mechanism for holding said coupling frame in adjusted position including a toggle member pivoted to said coupling frame, a coöperating toggle member pivoted to said first mentioned toggle member and to said main frame, operating mechanism carried on said main frame for adjusting said coupling frame, and means movable with said mechanism for breaking said toggle mechanism.

12. In a mowing machine, a main frame, a coupling frame adjustably mounted thereon, toggle mechanism for holding said coupling frame in adjusted position including a toggle member pivoted to said coupling frame, a coöperating toggle member pivoted to said first mentioned toggle member and to said main frame, operating mechanism carried on said main frame for adjusting said coupling frame, and means movable with said mechanism for holding said toggle mechanism in locked position and breaking the same.

13. In a mowing machine, a main frame, a finger bar, a coupling frame, an operating lever, flexible connections between said operating lever and said finger bar operable to raise said finger bar and coupling frame during the initial movement of said lever, and means including a toggle connection controlled by said operating lever for locking said coupling frame in elevated position during a continued movement of said lever and automatically releasing it upon a reverse movement of said lever.

14. In a mowing machine, a main frame, a coupling frame adjustably mounted thereon, a finger bar adjustably mounted on said coupling frame, a lever carried on said main frame operatively connected to said finger bar and coupling frame, a toggle operatively connected between said main frame and coupling frame, said toggle having a projecting pivot pin, and means carried on said lever engaging said pivot pin to break said toggle upon a predetermined movement of said lever.

15. In a mowing machine, a main frame, a coupling frame adjustably mounted thereon, a finger bar adjustably mounted on said coupling frame, an operating member carried on said main frame operatively connected to said finger bar and coupling frame, a toggle operatively connected between said frames, said toggle having a projecting pivot pin, and means operable by said operating member and engaging said pin to lock said toggle and break the same upon a predetermined movement of said member.

16. In a mowing machine, a main frame, a coupling frame pivotally mounted thereon, adjusting mechanism therefor including an operating lever pivoted on said main frame, a toggle connection intermediate said main frame and said coupling frame for locking the latter in elevated position during a predetermined movement of said lever, and means movable with said operating lever to hold said toggle mechanism in locking position during a predetermined movement of said lever.

17. In a mowing machine, a main frame, a coupling frame pivotally mounted thereon, a finger bar pivotally mounted on said coupling frame, an operating lever mounted on said main frame, means for varying the elevation of said finger bar and coupling frame, and swinging said finger bar to substantially vertical position, and supplemental coöperating means controlled by said operating lever for maintaining said coupling frame in predetermined elevated position until said finger bar has been swung downwardly to operative position.

18. In a mowing machine, a main frame, a coupling frame pivotally mounted thereon, a finger bar pivotally mounted on said coupling frame, an operating lever mounted on said main frame, means for varying the elevation of said finger bar and coupling frame and swinging said finger bar to substantially vertical position, and supplemental coöperating means including self-locking and unlocking toggle mechanism controlled by said lever for maintaining said coupling frame in a predetermined elevated position while said bar is moved to vertical position and releasing the same when said bar has been swung downwardly to operative position.

19. In a mowing machine, a main frame, a coupling frame adjustably mounted thereon, a finger bar pivotally mounted on said coupling frame, an operating lever pivotally mounted on said main frame, operative connections between said operating lever and said coupling frame and finger bar, and supplemental locking connections intermediate said main frame and said coupling frame for locking said coupling frame in a predetermined elevated position as said lever is moved in one direction and automatically releasing it upon a reverse movement of said lever.

20. In a mowing machine, a main frame, a coupling frame pivotally mounted thereon, lever mechanism carried on said main frame for varying the elevation of said coupling frame, a toggle connection intermediate said main frame and coupling frame coöperating with said lever mechanism, and means automatically actuated upon movement of said lever mechanism in opposite directions to lock and unlock said toggle in predetermined positions of said coupling frame.

21. In a mowing machine, a main frame, a coupling frame pivotally mounted thereon, a finger bar pivotally connected to said coupling frame, lever mechanism pivotally attached to said main frame and operatively connected with said finger bar and coupling frame adjustable to move said finger bar and coupling frame about their pivots, and locking mechanism automatically locking said coupling frame in position upon movement of said lever in one direction and automatically releasing the same upon movement of said lever in the opposite direction.

22. In a mowing machine, a main frame, a coupling frame adjustably mounted thereon, operating mechanism including a lever carried on said main frame for varying the elevation of said coupling frame, an elongated upwardly extending toggle member pivoted to said coupling frame and having a rearwardly extending curved end, a coöperating shorter toggle link operatively connected at one end to the curved end of said elongated toggle member and pivoted at its opposite end to said main frame, and means movable with said lever for controlling said toggle connection.

23. In a mowing machine, a main frame, a coupling frame adjustably mounted thereon, a finger bar adjustably mounted on said frame, operating mechanism carried on said main frame for adjusting said coupling frame and finger bar, a lever pivoted at a point intermediate its ends to said coupling frame having one end of the same operatively connected to said operating mechanism, and means operatively connected between the opposite end of said last mentioned lever and said main frame and controlled by said operating mechanism for controlling the movement of said coupling frame.

24. In a mowing machine, a main frame, a coupling frame adjustably mounted thereon, a finger bar adjustably mounted on said coupling frame, operative connections carried on said main frame for adjusting said coupling frame and finger bar, a lever pivoted at a point intermediate its ends to said coupling frame having one end of the same operatively connected to said operating mechanism, and toggle mechanism operatively connected between the opposite end of said last mentioned lever and said main frame controlled by said operating mechanism.

25. In a mowing machine, a main frame, a coupling frame adjustably mounted thereon, a finger bar adjustably mounted on said coupling frame, means for raising said coupling frame and swinging said finger bar about said coupling frame as a pivot to a substantially vertical position, and means including toggle mechanism operatively connected between said main and coupling frames whereby said coupling frame is automatically locked in elevated position prior to the swinging movement of said finger bar to vertical position.

26. In a mowing machine, a main frame, a coupling frame adjustably mounted thereon, a finger bar adjustably mounted on said coupling frame, an operating lever carried on said frame, operative connections between the same and said finger bar and coupling frame for raising said coupling frame and swinging said finger bar about the latter as a pivot to substantially vertical position, and means including toggle mechanism operatively connected between said main and coupling frames controlled by said lever whereby said coupling frame after a predetermined elevation thereof is held in fixed position during the swinging movement of said finger bar to vertical position and during its return therefrom.

27. In a mowing machine, a main frame, a coupling frame pivotally mounted thereon, a finger bar pivoted on said coupling frame, an operating member carried on said frame operatively connected to said finger bar and coupling frame, a clutch carried by said frame and controlled by said operating member, a supplemental toggle connection intermediate said coupling frame and said main frame, and means controlled by said operating member automatically acting upon the movement of said finger bar to lock said coupling frame and clutch against movement, and upon a reverse movement of said finger bar to free the same.

28. In a mowing machine, a main frame, a coupling frame pivotally mounted thereon, a finger bar pivoted on said coupling frame, an adjusting lever carried on said main frame, operative connections between the same and said coupling frame and finger bar and means intermediate said main and coupling frames and actuated upon movement of said lever for holding said coupling frame in one of its extreme positions during continued movement of said lever to move said finger bar independently of said coupling frame after said coupling frame has thus reached one of its limits of travel.

29. In a mowing machine, a main frame, a coupling frame pivotally mounted thereon, a finger bar pivotally mounted on said coupling frame, an operating lever carried on said main frame, operative connections between said operating lever and said finger bar and coupling frame operative to raise said finger bar and said coupling frame, and supplemental means coöperating therewith and controlled by the movement of said operating lever automatically locking said coupling frame in elevated position prior to the completion of the movement of said finger bar.

30. In a mowing machine, a main frame, a coupling frame pivotally mounted thereon, an operating lever pivoted on said main frame, a toggle connection intermediate said main frame and said coupling frame locking the latter in elevated position in a predetermined position of said lever, means movable with said lever for locking said toggle automatically prior to the completion of the movement of said lever in one direction, and means movable with said lever for automatically breaking the toggle after a predetermined movement of said lever in an opposite direction.

31. In a mowing machine, a main frame, a coupling frame pivotally mounted thereon, a finger bar pivotally mounted on said coupling frame, an operating lever carried on said main frame, operative connections between said operating lever and said finger bar and coupling frame for simultaneously raising said coupling frame and finger bar, supplemental connections intermediate said main frame and said coupling frame for locking said coupling frame in a predetermined elevated position, and means movable with said operating lever and retaining said coupling frame in locked position, automatically releasing the same when said finger bar occupies a predetermined position with respect to said coupling frame.

32. A mowing machine including, in combination, a wheeled frame, a coupling bar having one end thereof pivotally connected with said wheeled frame in a manner permitting the opposite end thereof to rise and fall relative to said frame, a finger bar hinged to said coupling bar in a manner permitting said finger bar to swing to substantially a vertical position, a lifting lever pivotally mounted upon said wheeled frame, a chain connection between said lever and said finger bar, a lever pivotally mounted upon said coupling bar, a sheave carried by one arm of said lever, said sheave engaging said chain, a toggle link having its lower end pivotally connected with the opposite end of said lever, a second toggle link having one end pivotally connected with said wheeled frame, the opposite end of said second link being pivotally connected with the opposite end of said first toggle link, a portion of said lifting lever during a part of the rearward movement thereof engaging with said second link in a manner to swing said links to a position whereby the coupling bar will be retained in an elevated position, and means carried by said lifting lever and adapted to swing said links in an opposite direction when said lifting lever has reached a predetermined part of its angular movement in a forward direction.

33. A mowing machine including, in combination, a wheeled frame, a coupling bar having one end thereof pivotally connected with said wheeled frame in a manner permitting the opposite end thereof to rise and fall relative to said frame, a finger bar hinged to said coupling bar in a manner permitting said finger bar to swing to substantially a vertical position, a lifting lever pivotally mounted upon said wheeled frame, a chain connecting said lever with said finger bar, a sheave carried by said coupling bar, said sheave engaging said chain, a link having its lower end pivotally connected with said coupling bar, an arm having one end pivotally connected with said wheeled frame, the opposite end of said arm being pivotally connected with the opposite end of said link, a laterally projecting stud carried by said arm, said lifting lever being provided with a hook portion adapted to engage with said stud, when said lever has reached a predetermined part of its angular movement in a direction to raise said coupling bar and said finger bar, in a manner to swing the link and said arm to a position whereby said coupling bar will be retained in an elevated position, and a laterally projecting rib carried by said lever and adapted to contact with said stud in a manner to swing said link and said arm in an opposite direction when said lever has reached a predetermined part of its angular movement in a direction to lower said finger bar and said coupling bar.

34. A mowing machine including, in combination, a wheeled frame, cutting apparatus carried thereby, said cutting apparatus including a coupling bar having one end thereof pivotally connected with said wheeled frame in a manner permitting the opposite end thereof to rise and fall relative to said frame, a finger bar pivotally connected with said coupling bar in a manner permitting said finger bar to swing to substantially a vertical position, a lifting lever pivotally mounted upon said wheeled frame, a chain connecting said lever with said finger bar, a sheave carried by said coupling bar, said sheave engaging said chain, power transmitting mechanism operatively connected with said cutting apparatus, said mechanism including a clutch, means for controlling the operation of said clutch, said means being connected with said lifting lever, and toggle mechanism connecting said coupling bar with said wheeled frame, said toggle mechanism being operative to sustain said coupling frame in an elevated position when the members thereof are moved to a predetermined angle relative to each other, said lifting lever being operative in a manner to simultaneously control said toggle mechanism and said clutch controlling means.

ALBERT GRIEVES.

Witnesses:
W. B. KENDIG,
H. J. GUYTON.

Copies of this patent may be obtained for five cents each, by addressing the "Commissioner of Patents, Washington, D. C."